(12) United States Patent
Kobayashi

(10) Patent No.: US 7,184,219 B2
(45) Date of Patent: Feb. 27, 2007

(54) PROJECTION LENS SYSTEM AND PROJECTOR

(75) Inventor: Kiwamu Kobayashi, Fujimi-machi (JP)

(73) Assignee: Nittoh Kogaku K.K., Nagano (JP)

( * ) Notice: Subject to any disclaimer, the term of this patent is extended or adjusted under 35 U.S.C. 154(b) by 0 days.

(21) Appl. No.: 11/348,076

(22) Filed: Feb. 6, 2006

(65) Prior Publication Data
US 2006/0176577 A1    Aug. 10, 2006

(30) Foreign Application Priority Data
Feb. 7, 2005 (JP) ............................. 2005-030608

(51) Int. Cl.
*G02B 9/00* (2006.01)
(52) U.S. Cl. .................. 359/651; 359/649; 359/680; 359/691
(58) Field of Classification Search ............... 359/649, 359/650, 651, 680, 691
See application file for complete search history.

(56) References Cited

U.S. PATENT DOCUMENTS 2,660,094 A * 11/1953 Wreathall .................. 359/650
6,317,269 B1 * 11/2001 Yamamoto .................. 359/651
6,471,359 B1 * 10/2002 Kim et al. .................. 353/122

FOREIGN PATENT DOCUMENTS

JP    2000-338448    12/2000

* cited by examiner

Primary Examiner—Scott J. Sugarman
Assistant Examiner—Darryl J. Collins
(74) Attorney, Agent, or Firm—Thompson Hine LLC

(57) ABSTRACT

A projection lens system that is suited to a compact, wide-angle lens system. The projection lens system projects projection light from a light modulator onto a screen, wherein the projection lens system is constructed, in order from a screen side thereof, of a first lens group with negative refractive power and a second lens group with positive refractive power and is non-telecentric on an incident side thereof, and the second lens group includes a pair of cemented doublet lenses with positive refractive power whose cemented surfaces face in opposite directions and a cemented triplet lens with positive refractive power.

7 Claims, 2 Drawing Sheets

PROJECTION LENS SYSTEM AND PROJECTOR

CROSS-REFERENCE TO RELATED APPLICATION

This application is based upon and claims the benefit of priority from the prior Japanese Patent Application No. 2005-30608, filed Feb. 7, 2005, the entire contents of which are incorporated herein by reference.

BACKGROUND

The present invention relates to a projection lens system of a projector that enlarges and projects an image displayed on a light valve onto a screen.

Conventionally, a liquid crystal display device is often used as the light modulator (light valve) of a projector. In recent years, in place of a liquid crystal display device, apparatuses equipped with a plurality of elements that uses a micromachining technique and change mechanically the directions of reflection of light for forming images have been realized. One example of such an apparatus is a DMD (digital mirror device, foil deforming device or display) in which minute mirror-surface elements (micromirrors) are arranged in an array corresponding to pixels and an image is displayed by controlling the angles of the respective mirror surfaces. Compared to a liquid crystal display device, a light modulator with micromirrors for making pixels has faster response and produces a brighter image, so that a light modulator of such type is suited to the realization of a compact projector with high luminance and high image quality.

To enable a dichroic prism to favorably split light into colors and to produce a bright image using the display characteristics of a liquid crystal display device, the incident side of a projection lens system is normally designed so as to be telecentric. On the other hand, to suppress the production of ghosts and blurring of colors due to the dichroic film, the use of a non-telecentric projection system has also been proposed.

In a projector where color images are displayed by time division using a DMD as the light valve, by suitably selecting the illumination system and optical system, it is possible to use a non-telecentric optical system as the projection lens system. When a non-telecentric optical system is applied, it is possible to use a lens group with a small diameter on the light valve side of the projection lens system, and therefore the entire lens system can be made compact. For a so-called "retrofocus lens system" composed of two lens groups with respectively negative and positive refractive powers disposed in that order from the screen side of the lens system, it is easy to provide a long back focus on the image-reducing side (i.e., the incident side) and to make the lens system telecentric, and therefore such retrofocus lens systems are often used as projector lenses. Since this type of lens system can easy increase the field angle, a retrofocus lens systems are suited to not only telecentric system but also non-telecentric system. However, in a non-telecentric optical system, image height has a much larger effect than for telecentric optical systems, and therefore it becomes difficult to correct aberration.

In addition, among domestic electrical appliances, there is demand for a compact display system with a large screen where the distance between the screen and projector is short. In particular, there is demand for a compact wide-angle lens system that can be used in a rear projector where the screen is integrally provided. A projector lens that is non-telecentric on the incident side can be produced with a compact overall structure, and by positioning the lens group of the projection side close to the pupil position on the screen side, it is possible to produce a wide angle lens system with a large field angle. However, in addition to the incident side not being telecentric, as the field angle of the lens group on the screen side increases, it becomes increasingly difficult to correct curvature of field in response to changes in image height. To correct curvature of field, it is necessary to reduce the Petzval sum, and to do so, it is necessary to dispose concave surfaces with sufficiently high curvature with respect to the convex surfaces and/or to provide sufficient distance between concave and convex lenses, resulting in an increase in the number of lenses and in an increase in the length of the lens system.

As a compact, wide-angle lens system, it is preferable to use a simple combination of lens groups with respectively negative and positive refractive powers from the screen side. A negative lens on the screen side has the largest diameter out of the lenses in the lens system, with the diameter of such lens further increasing as the field angle is increased. Accordingly, when a surface with large curvature is used, both design and manufacturing become difficult. A plastic lens is preferable for the lens or lenses on the screen side in view of the cost and weight of large-diameter, however, changes in temperature have an especially large effect on plastic lens. Basing on the above conditions, for the first lens group on the screen side, it is difficult to achieve a sufficient refractive power for correcting aberration.

On the other hand, if many convex/concave lenses are used in the second lens group on the light valve side, to provide sufficient distance between the lenses, it becomes similar arrangement of a system that has a multiple-group such as a negative-positive-negative-positive, so that a compact lens system cannot be realized.

In addition, to reduce the Petzval sum to correct the curvature of field, it is preferable to dispose convex and concave lenses a sufficient distance apart, but when many lenses are used, the overall length of the lens system becomes too long.

It is an object of the present invention to provide a compact, wide-angle lens system with a two-lens group construction that is non-telecentric on the incident side. It is a further object of this invention to provide a projector that is more compact and can display sharp images.

SUMMARY

One of the aspect of the present invention is a projection lens system that projects projection light from a light modulator onto a screen, wherein the projection lens system is constructed, in order from a screen side thereof, of a first lens group with negative refractive power and a second lens group with positive refractive power and is non-telecentric on an incident side thereof, and the second lens group includes a pair of cemented doublet lenses with positive refractive power whose cemented surfaces face in opposite directions and a cemented triplet lens with positive refractive power.

In the projection lens system, the second lens group includes a pair of cemented doublet lenses with positive refractive power whose cemented surfaces face in opposite directions and a cemented triplet lens with positive refractive power. The pair of cemented doublet lenses with positive refractive power whose cemented surfaces face in opposite directions are positive in terms of refractive power and therefore suited to be a part of the positive second lens group, and by setting the curvature of the cemented surfaces that face in opposite directions inside the cemented lenses sufficiently highly, the Petzval sum can be effectively reduced.

In addition, the pair of cemented doublet lenses has a favorable correcting performance for chromatic aberration and since the lens arrangement is symmetrical, the pair is suited to correcting other types of aberration, such as coma aberration.

The cemented triplet lens that has positive refractive power is also suited to be a part of the positive second lens group. In addition, since it is possible to form surfaces with large curvature that face in opposite directions in the cemented triplet lens, it is possible to effectively reduce the Petzval sum using configuration. Also, since the triplet is a cemented lens, the chromatic aberration correcting performance is favorable and since the lens arrangement is symmetrical, the cemented triplet lens is suited to correcting other types of aberration such as coma aberration.

In the lens system included in the present invention, by including the pair of cemented doublet lenses with positive refractive power and the cemented triplet lens with positive refractive power in the second lens group, it is possible to greatly improve the performance for correcting aberration including curvature of field without increasing the length of the second lens group. Accordingly, it is possible to provide a compact, wide-angle lens system that makes the most of the incident side being non-telecentric. In particular, the pair of cemented doublet lenses should preferably be disposed on the screen side and conversely the cemented triplet lens should preferably be disposed on the light valve side of the second lens group. The screen side of the second lens group has a slightly large diameter as the incident side of the first lens group and off-axis rays are distant from the optical axis. Accordingly, the conditions are suited to the correction of chromatic aberration by doublet lenses, and compared to a cemented triplet lens, it is more economical to make the diameters of cemented doublet lenses larger.

On the other hand, on the light valve side of the second lens group, since the incident side is non-telecentric, it is possible to reduce the diameter of the lens and rays are concentrated in the periphery of the optical axis. By disposing convex/concave surfaces with large curvature it is possible to effectively reduce the Petzval sum using a compact lens, and therefore disposing a cemented triplet lens at such position is preferable in terms of both the correction of aberration and cost. In addition, the cemented triplet lens can prevent the production of ghosts and can effectively correct longitudinal chromatic aberration and chromatic aberration of magnification.

On the incident side of the cemented triplet lens, rays incident from the light valve are still in the process of being concentrated at the optical axis, and therefore the off-axis rays are located away from the optical axis. Accordingly, by disposing a cemented doublet lens with positive refractive power at such position, it is possible to correct chromatic aberration even more favorably and since the number of convex/concave surfaces increases, an effect of reducing the Petzval sum can be obtained.

In this way, by providing the second lens group with a favorable aberration correcting performance, it is possible to reduce the power of the first lens group, and in particular the power of the first lens closest to the screen in the first lens group. That is, it is preferable that a focal length f11 of the first lens closest to the screen and a combined focal length fw of the projection lens system satisfy the condition (A) below.

$$|f11/fw|<0.1 \qquad (A)$$

By suppressing the power of the first lens to within such range, it is possible to suppress fluctuations in temperature and a negative aspherical plastic lens can be applied as the first lens to increase lens diameter with a low-cost. Accordingly, it is possible to provide a wide angle lens where aberration is corrected favorably. One of example of the lens system included in the present invention has a wide half-field angle of 47° or above with favorable image forming performance.

The non-telecentric lens system included in the invention is suited to a projection lens that projects, onto a screen, projection light from the light modulator, such as a DMD or the like that includes a plurality of elements changing directions of reflection of light and generating an image. Another aspect of this invention is a projector that includes the projection lens system, a light modulator and an illuminating system that emits light onto the light modulator. The projector is compact with wide angle lens system and can project large, sharp images on to a large screen.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

DETAILED DESCRIPTION

Figure 1:
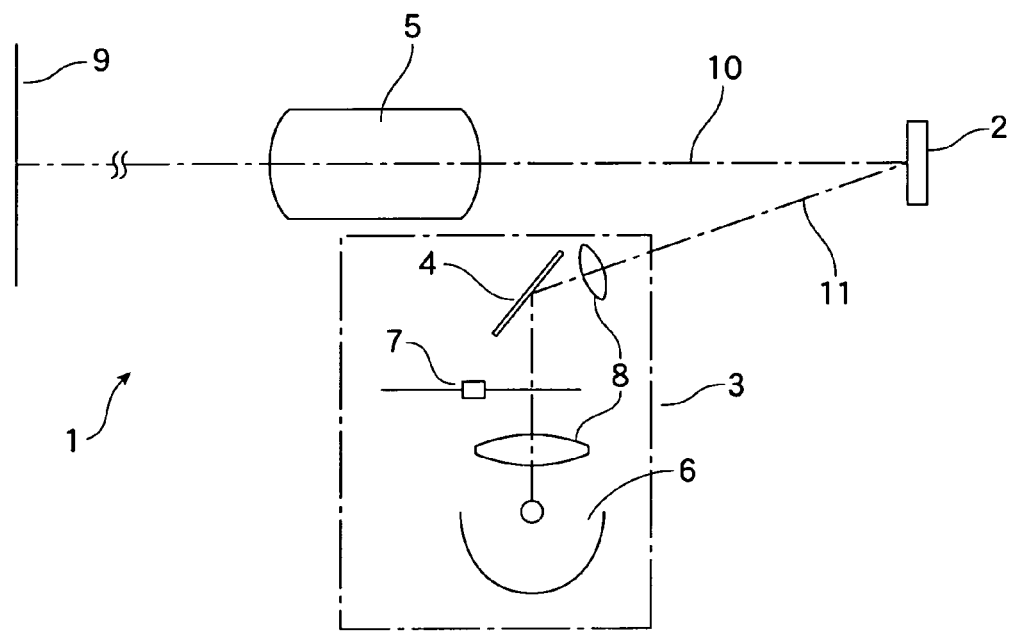
FIG. 1 shows the overall arrangement of a projector.

FIG. 1 shows the overall construction of a projector 1 that uses a DMD as a light valve. The projector 1 includes a DMD 2 (light valve) as a light modulator, a system 3 that emits the DMD 2 with illuminating light 11 to be modulated, and a projection zoom lens 5 for projecting projection light 10 that has been reflected in an active direction by the DMD 2 onto a screen 9. The projector 1 shown in FIG. 1 is a single-panel video projector, and the illumination system 3 comprises a white light source 6, such as a halogen lamp, and a rotating color splitting filter 7 in the shape of a disc. By the illuminating system 3, light of the three primary colors red, green, and blue is shone onto the DMD 2 using time division. By controlling the elements corresponding to the individual pixels at the timing at which the light of the respective colors is shone, a color image is displayed. The illuminating system 3 further includes an illumination lens system 8 that collimates light from the light source 6 and outputs non-telecentric illuminating light 11 to the DMD 2 via a mirror 4.

Figure 2:
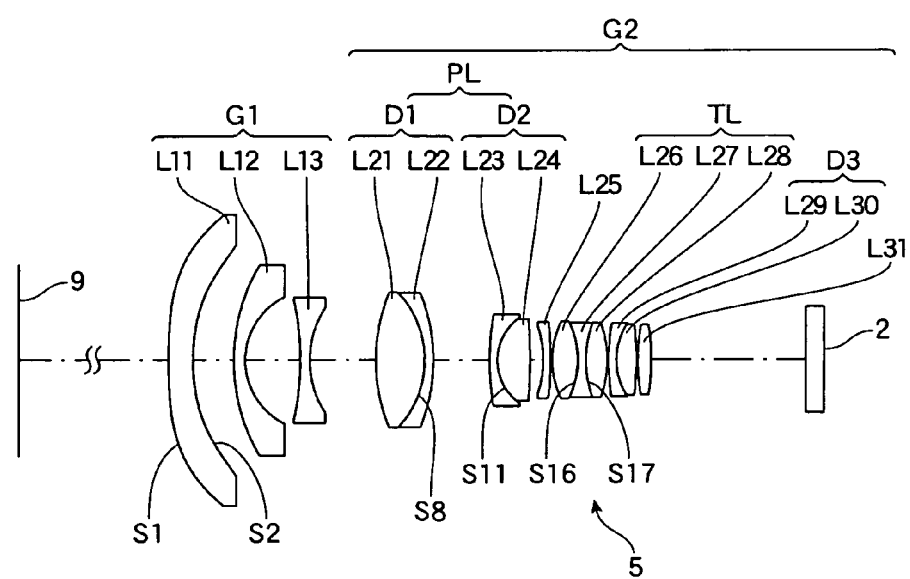
FIG. 2 shows the arrangement of a projection lens system included in the present invention.

FIG. 2 shows one example of the projection zoom lens 5 according to the one of aspect of the present invention. The projection zoom lens 5 is composed of fourteen lenses numbered L11 to L13 and L21 to L31 that are split into two lens groups numbered G1 and G2 in order from the screen 9 side of the projection zoom lens 5. Detailed data on the respective lenses is given below.

The first lens group G1 on the screen side has an overall negative refractive power, is composed of negative meniscus lenses L11 and L12 that are positioned on the screen side (i.e., at the front) of the projection zoom lens 5 and are convex on the screen 9 sides respectively and a biconcave negative lens L13. The lens L11 positioned closest to the screen 9 is a plastic lens and both surfaces S1 and S2 thereof are aspherical.

The second lens group G2 positioned on the DMD 2 side of the projection zoom lens 5 has an overall positive refractive power and is composed of a cemented doublet lens D1 where a positive biconvex lens L21 and a negative meniscus lens L22 that is concave on the screen 9 side are cemented together, a cemented doublet lens D2 where a negative meniscus lens L23 that is convex on the screen 9 side and a positive biconvex lens L24 are cemented together, a negative meniscus lens L25 that is concave on the screen 9 side, a cemented triplet lens TL where a positive biconvex lens L26, a negative biconcave lens L27, and a positive biconvex lens L28 are cemented together, a cemented doublet lens D3 where a negative meniscus lens L29 that is convex on the screen 9 side and a positive biconvex lens L30 are cemented together, and a positive biconvex lens L31.

Accordingly, the second lens group G2 of the projection zoom lens 5 includes three cemented doublet lenses (balsam lenses) D1, D2, and D3 and one cemented triplet lens TL. The cemented doublet lenses D1 and D2 on the screen side of the second lens group G2 construct a pair PL of cemented doublet lenses with positive refractive power where the cemented surfaces S8 and S11 face in opposite directions.

In the lens data given below, "ri" represents the radius of curvature (mm) of the lens surfaces S1 to S24 numbered in order from the screen side, "di" represents the distance (mm) between the respective lens surfaces numbered in order from the screen side, "nd" represents the radius of curvature (d line) of each lens numbered in order from the screen side, and "vd" represents the Abbe number (d line) of each lens numbered in order from the screen side. Also, "Type" shows whether the lens type is spherical ("SPH") or aspherical ("ASP").

LENS DATA

| No. | ri | Type | di | nd | vd | |
|---|---|---|---|---|---|---|
| 1 | 281.95300 | ASP | 5.5000 | 1.52500 | 56.20 | lens L11 |
| 2 | 51.33900 | ASP | 9.3000 | | | |
| 3 | 45.01100 | SPH | 2.6000 | 1.67000 | 47.20 | lens L12 |
| 4 | 16.60000 | SPH | 12.5000 | | | |
| 5 | −63.65800 | SPH | 2.1000 | 1.74300 | 49.40 | lens L13 |
| 6 | 22.83100 | SPH | 15.2000 | | | |
| 7 | 41.78900 | SPH | 11.2000 | 1.67300 | 32.10 | lens L21(D1) |
| 8 | −22.79800 | SPH | 2.0000 | 1.84700 | 23.80 | lens L22 |
| 9 | −41.29200 | SPH | 13.0000 | | | |
| 10 | 64.54300 | SPH | 1.8000 | 1.77300 | 49.60 | lens L23(D2) |
| 11 | 12.22400 | SPH | 7.5000 | 1.62000 | 36.30 | lens L24 |
| 12 | −138.54600 | SPH | 3.0000 | | | |
| 13 | −24.63200 | SPH | 1.7000 | 1.84700 | 23.80 | lens L25 |
| 14 | −72.50900 | SPH | 0.4000 | | | |
| 15 | 20.67200 | SPH | 5.8000 | 1.62000 | 36.30 | lens L26(TL) |
| 16 | −20.67200 | SPH | 1.8000 | 1.83400 | 37.20 | lens L27 |
| 17 | 24.82500 | SPH | 4.9000 | 1.51600 | 64.10 | lens L28 |
| 18 | −24.82500 | SPH | 0.3000 | | | |
| 19 | 62.08500 | SPH | 1.7000 | 1.83400 | 37.20 | lens L29(D3) |
| 20 | 15.18000 | SPH | 4.6000 | 1.48700 | 70.20 | lens L30 |
| 21 | −57.34100 | SPH | 0.3000 | | | |
| 22 | 52.39300 | SPH | 3.0000 | 1.48700 | 70.20 | lens L31 |
| 23 | −52.39300 | SPH | 35.6600 | | | |

The aspherical coefficients of both surfaces S1 and S2 of the lens L11 that is closest to the screen are as follows.

Surface S1
R=281.953, K=0.0000
A=1.3644×10⁻⁵, B=−1.0494×10⁻⁸
C=7.2586×10⁻¹², D=−2.0652×10⁻¹⁵

The aspherical surfaces are expressed by the following expression using the coefficients K, A, B, C, and D given above with X as the coordinate in the optical axis direction, Y as the coordinate in a direction perpendicular to the optical axis, the direction in which light propagates as positive, and R as the paraxial radius of curvature. This is also the case hereinafter.

$$X=(1/R)Y^2/[1+\{1-(1+K)(1/R)^2Y^2\}^{1/2}]+AY^4+BY^6+CY^8+DY^{10}$$

Surface S2
R=51.339, K=0.0000
A=1.0026×10⁻⁵, B=−2.3509×10⁻⁹
C=−1.2569×10⁻¹¹, D=6.7618×10⁻¹⁵

Various parameters for the projection lens 5 are as follows.

Distance from the surface S1 of lens L11 to the screen: 1100 mm

Combined focal length: 10.1 mm

Half-field angle: 47.3°

Back focus length: 35.66 mm

Focal length of the lens L11: 120.2 mm

Accordingly, the condition (A) described above is as shown below.

$$|f11/fw|=0.084$$

Figure 3:
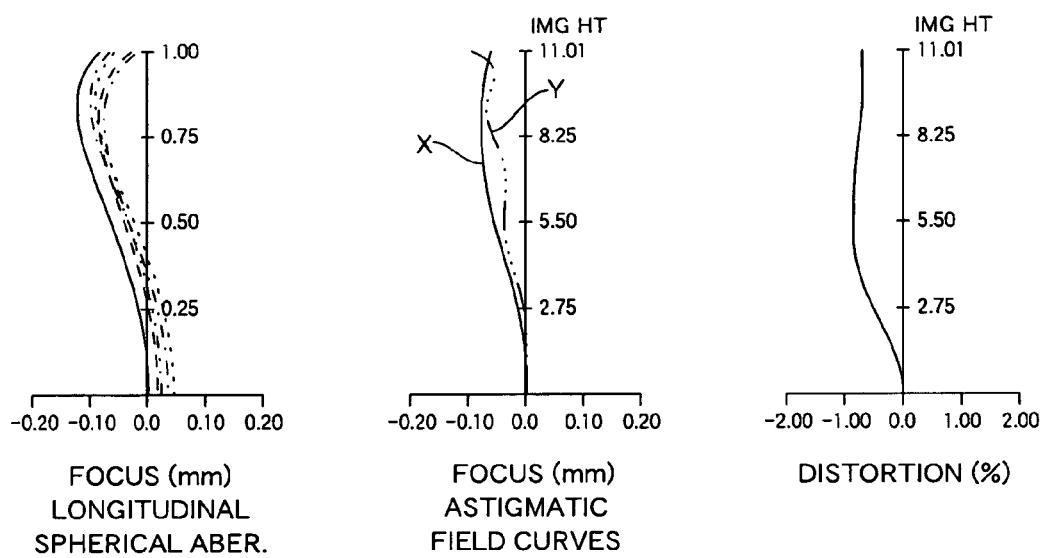
FIG. 3 is a series of graphs showing longitudinal aberration of the projection lens system shown in FIG. 2.

FIG. 3 shows the spherical aberration, astigmatism, and distortion of the projection lens system 5. Values of the spherical aberration are given for the respective wavelengths 670.0 nm (dotted line), 650.0 nm (dot-dash line), 550.0 nm (solid line), 450.0 nm (dash line), and 440.0 nm (dot-dot-dash line). In addition, in the graph showing astigmatism, the aberrations for tangential rays (Y) and sagittal rays (X) are shown. As shown in the graphs, longitudinal aberration of the projection lens system 5 is in a range of around ±0.1 mm, so that the aberration is corrected extremely favorably.

Figure 4:
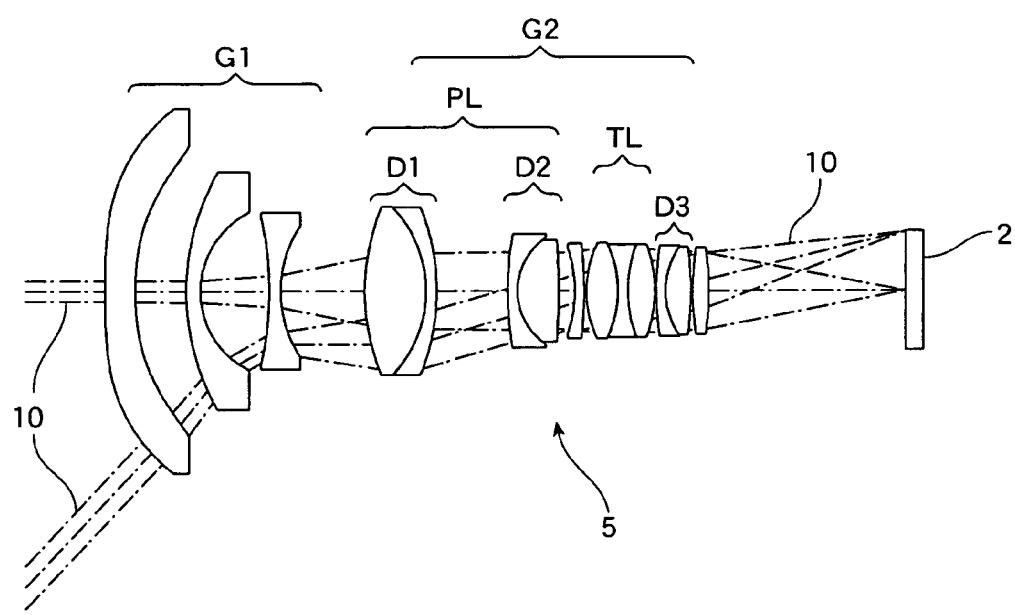
FIG. 4 shows some of the rays that pass through the projection lens system shown in FIG. 2.

FIG. 4 shows part of the projection light 10 projected onto the screen 9 via the projection zoom lens 5. The projection lens 5 is a retrofocus type lens system that has a combination of a first lens group G1 with negative refractive power and a second lens group G2 with positive refractive power, and the side of the projection zoom lens 5 on which the illuminating light 11 from the light valve 2 is incident is non-telecentric with principal rays widening toward the light valve 2. In addition, the second lens group G2 of the projection zoom lens 5 includes the pair PL of the cemented doublet lenses D1 and D2, which have positive refractive power and where the cemented surfaces S8 and S11 face in opposite directions, on the screen 9 side, and the cemented triplet lens TL that has positive refractive power and the cemented doublet lens D3 that has a positive refractive power on the light valve 2 side. The cemented doublet lenses D1, D2, and D3 and the cemented triplet lens TL have positive powers as cemented lenses respectively, and therefore the power distribution in the second lens group G2 is the same as a six-lens construction of lenses that are respectively positive, positive, negative, positive, positive, and positive from the screen 9 side. Accordingly, by arranging these cemented lenses D1, D2, D3, and TL, in the second lens group G2 has a suitable arrangement as an overall positive power lens group with disposing as many as eleven lenses without extending the length of the lens group.

The pair PL of the cemented doublet lenses D1 and D2 where the cemented surfaces S8 and 511 face in opposite directions is suited to correcting chromatic aberration, and the curvature of the cemented surfaces S8 and S11 that face in opposite directions in the cemented doublet lenses D1 and D2 can be sufficiently high to effectively reduce the Petzval sum. Accordingly, the pair PL of the cemented doublet lenses D1 and D2 is suited to correcting curvature of field. In addition, by disposing the pair PL on the screen 9 side of the second lens group G2 where the rays incident on the first lens group G1 widen, it is possible to effectively correct chromatic aberration for off-axis rays using the peripheral portions of the lenses D1 and D2. Also, since the pair PL of cemented doublet lenses D1 and D2 is a symmetrical lens arrangement, it is possible to favorably correct various kinds of aberration such as coma aberration.

The cemented triplet lens TL is constructed by cementing together positive, negative, and positive lenses. Accordingly, since surfaces S16 and S17 that face in opposite directions and have large curvature can be formed inside the cemented lens TL, it is possible to effectively reduce the Petzval sum in a compact lens. In addition, by disposing the cemented triplet lens TL at a position where rays are concentrated on the incident side of a projection lens system 5 whose incident side is non-telecentric, it is possible to reduce the diameter of the cemented triplet lens TL and thereby reduce the cost. By disposing the triplet lens TL at the position where the rays are concentrated on the optical axis, increasing the curvature of the internal cemented surfaces S16 and S17 is even more effective in reducing the Petzval sum, so that curvature of field can be corrected more favorably. Also, since the cemented triplet lens TL is a symmetrical lens arrangement, it is possible to favorably correct other types of aberration such as coma aberration. In addition, the cemented triplet lens TL can prevent the production of ghosts and can effectively correct longitudinal chromatic aberration and chromatic aberration of magnification.

Further, the cemented doublet lens D3 is disposed on the light valve 2 side of the cemented triplet lens TL. At the light valve 2 side of the cemented triplet lens TL, the incident light (in particular, off-axis light) from the light valve 2 is still distant from the optical axis of the projection zoom lens 5, and therefore by disposing the doublet lens D3, it is possible to effectively correct other types of aberration including chromatic aberration on the incident side.

In this way, in the projection lens system 5 included in the present embodiment, by making the incident side non-telecentric, it is possible to reduce the diameter of the second lens group G2 and to make the overall length of the lens system 5 shorter, and by disposing the cemented doublet lenses and triplet lens described above in the second lens group G2, it is possible to increase the aberration correcting performance and in particular the curvature of field correcting performance. Accordingly, it is possible to provide a wide-angle projection lens system that is compact and can sharply project a large image, and in the present embodiment, a half-field angle of over 47° is achieved.

In addition, by improving the correction of aberration such as curvature of field by the second lens group G2, it is possible to reduce the aberration-correcting load of the first lens group G1 and the power of the first lens group G1. In particular, the power distributed on the lens L11 closest to the screen 9 that has a large diameter can be reduced. Accordingly, a plastic lens which can be manufactured at low cost can be used for the lens L11 closest to the screen, and the effect of changes in temperature of the lens L11 on the image forming performance of the lens system 5 can be suppressed. Accordingly, it is possible to provide a compact, wide-angle lens system with stable performance in response to changes in temperature.

With the projector 1 that uses the projection lens system 5, it is possible to project a large image from a position close to the screen 9, and it is therefore possible to provide a compact projector that has a large screen. In particular, in the rear projector 1, since the illuminating system 3, the light valve 2, the projection lens system 5, and the screen 9 are housed inside a housing, reducing the distance from the projection lens system 5 to the screen 9 is effective in making the entire projector 1 compact. In addition, even if the temperature rises inside the housing, reduction in the image forming performance of the projection lens system 5 is prevented, and therefore it is possible to stably output a large image with high image quality onto a screen.

What is claimed is:

1. A projection lens system that projects projection light from a light modulator onto a screen,
    wherein the projection lens system is constructed, in order from a screen side thereof, of a first lens group with negative refractive power and a second lens group with positive refractive power and is non-telecentric on an incident side thereof, and
    the second lens group includes a pair of cemented doublet lenses with positive refractive power whose cemented surfaces face in opposite directions and a cemented triplet lens with positive refractive power.

2. The projection lens system according to claim 1, wherein cemented surfaces of the cemented triplet lens face in opposite directions.

3. The projection lens system according to claim 1, wherein the pair of cemented doublet lenses are disposed on a screen side of the second lens group.

4. The projection lens system according to claim 3, wherein a cemented doublet lens with positive refractive power is disposed on an incident side of the cemented triplet lens.

5. The projection lens system according to claim 1, wherein a first lens closest to a screen side in the first lens group is a negative aspherical plastic lens and a focal length f11 of the first lens and a combined focal length fw of the projection lens system satisfy a condition below $|f11/fw|<0.1$.

6. The projection lens system according to claim 1, wherein the projection lens system projects the projection light onto the screen from the light modulator that includes a plurality of elements that change the direction of reflection of light for generating an image.

7. A projector, comprising the projection lens system according claim 1, the light modulator, and an illuminating system for emitting light onto the light modulator.

* * * * *